(12) United States Patent
Larry et al.

(10) Patent No.: US 11,194,214 B2
(45) Date of Patent: Dec. 7, 2021

(54) REVERSIBLE CONFIGURATION OF CONTENT PRESENTATION DIRECTION IN TRANSPARENT DISPLAYS

(71) Applicant: Ford Global Technologies, LLC, Dearborn, MI (US)

(72) Inventors: Mark Larry, Macomb Township, MI (US); Erick Lavoie, Dearborn, MI (US); Biaohe Guo, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 16/355,318

(22) Filed: Mar. 15, 2019

(65) Prior Publication Data
US 2020/0292904 A1 Sep. 17, 2020

(51) Int. Cl.
*G02F 1/157* (2006.01)
*G02F 1/163* (2006.01)
(Continued)

(52) U.S. Cl.
CPC .............. *G02F 1/163* (2013.01); *B60J 3/04* (2013.01); *B60R 11/0235* (2013.01); *B60R 2011/0043* (2013.01); *G02F 2203/01* (2013.01)

(58) Field of Classification Search
CPC .. G02F 1/163; G02F 2203/01; G02F 2201/44; G02F 1/133618; G02F 1/1313;
(Continued)

(56) References Cited

U.S. PATENT DOCUMENTS

| | | | | |
|---|---|---|---|---|
| 4,805,996 A | * | 2/1989 | Carlson | B60J 3/04 359/275 |
| 6,356,376 B1 | * | 3/2002 | Tonar | B60Q 1/2665 359/267 |

(Continued)

OTHER PUBLICATIONS

Demiryont, et al. (2009). Solid-State Monolithic Electrochromic Switchable Visors and Spectacles. Proceedings of SPIE—The International Society for Optical Engineering, Head- and Helmet-Mounted Displays XIV: Design and Applications. vol. 7326. pp. 73260K-1-73260K-8. Doi: 10.1117/12.818730.

(Continued)

*Primary Examiner* — Balram T Parbadia
(74) *Attorney, Agent, or Firm* — Michael Spenner; Eversheds Sutherland (US) LLP

(57) ABSTRACT

Display technologies are provided for configuring the direction of content presentation using a single display assembly. In some embodiments, the display assembly includes a transparent display unit intercalated between a first switchable layer and a second switchable layer. Each one of the first switchable layer and the second switchable layer is formed to reversibly transition between a transparent state and an opaque state in response to an applied electric field. The transparent display unit, the first switchable layer, and the second switchable layer can be operated individually to configure a particular direction of presenting digital content. In other embodiments, the display assembly includes a switchable layer intercalated between a first transparent display unit and a second transparent display unit. The switchable layer, the first transparent display unit, and the second transparent display unit can be operated individually to configure a particular direction of presenting digital content.

20 Claims, 9 Drawing Sheets

(51) Int. Cl.
  *B60R 11/00* (2006.01)
  *B60R 11/02* (2006.01)
  *B60J 3/04* (2006.01)

(58) Field of Classification Search
  CPC ... G02F 1/157; G02F 1/15; B60R 2011/0043; B60R 11/0235; B60J 3/04; G09F 9/35; H01L 27/3241
  See application file for complete search history.

(56) References Cited

U.S. PATENT DOCUMENTS

| | | | |
|---|---|---|---|
| 9,361,851 B1* | 6/2016 | Basehore | G06F 1/1616 |
| 9,493,121 B2 | 11/2016 | Hercules | |
| 2007/0131949 A1* | 6/2007 | Liu | H01L 51/008 |
| | | | 257/89 |
| 2011/0292487 A1* | 12/2011 | Noh | G02F 1/15 |
| | | | 359/265 |
| 2012/0019434 A1* | 1/2012 | Kuhlman | G09G 3/36 |
| | | | 345/1.3 |
| 2014/0085913 A1* | 3/2014 | Han | B60R 1/04 |
| | | | 362/459 |
| 2015/0232030 A1 | 8/2015 | Bongwald | |
| 2018/0217429 A1* | 8/2018 | Busch | G02F 1/076 |

OTHER PUBLICATIONS

Kim, et al., "Next generation smart window display using transparent organic display and light blocking screen," 2018, vol. 26, Issue 7, pp. 8493-8502 https://doi.org/10.1364/OE.26.008493.

* cited by examiner

REVERSIBLE CONFIGURATION OF CONTENT PRESENTATION DIRECTION IN TRANSPARENT DISPLAYS

BACKGROUND

Various types of information are commonly presented on surfaces of a vehicle. Such information, however, generally includes regulatory information (license plates, disability decals, and the like) and/or ornamental information. For some types of vehicles, such as police vehicles, first responder vehicles, public transit vehicles, and ride-sharing vehicles, markings are typically placed on surfaces of the vehicles for identification purposes. The markings are generally static. Some markings are commonly provided as media (stickers or wrappings, for example) adhered to the vehicle body. Other markings are formed using lights, such as light-emitting diodes (LEDs) mounted in an outer area of a vehicle or within a cabin of the vehicle. Regardless of the type of implementation, commonplace markings serve as exterior-facing displays, where the information conveyed by the markings can be readily consumed from the outside of the vehicle. Even in situations in which such markings are not static, the information presented by the markings is rather limited and still arranged in an exterior-facing orientation.

Other types of information can be presented within a cabin of a vehicle. In-cabin display devices can provide numerous types of information that can assist with the operation of the vehicle, navigation, and entertainment. In-cabin display devices are conspicuously arranged in an interior-facing arrangement that permits the occupants of the vehicle to consume the information within the cabin. Yet, the real estate for presentation of information on in-cabin display devices is usually limited relative to surfaces generally available in the cabin of a vehicle.

Therefore, much remains to be improved in conventional technologies for displaying information on interior and exterior surfaces of vehicles.

BRIEF DESCRIPTION OF THE DRAWINGS

The accompanying drawings are an integral part of the disclosure and are incorporated into the present specification. The drawings, which are not drawn to scale, illustrate some embodiments of the disclosure. The drawings in conjunction with the description and claims serve to explain, at least in part, various principles, aspects, and practical elements of the disclosure. Some embodiments of the disclosure are described more fully below with reference to the accompanying drawings. However, various aspects and elements of the disclosure can be implemented in many different forms and should not be construed as being limited to the implementations set forth herein. Like numbers refer to like, but not necessarily the same or identical, elements throughout.

DETAILED DESCRIPTION

Figure 1:
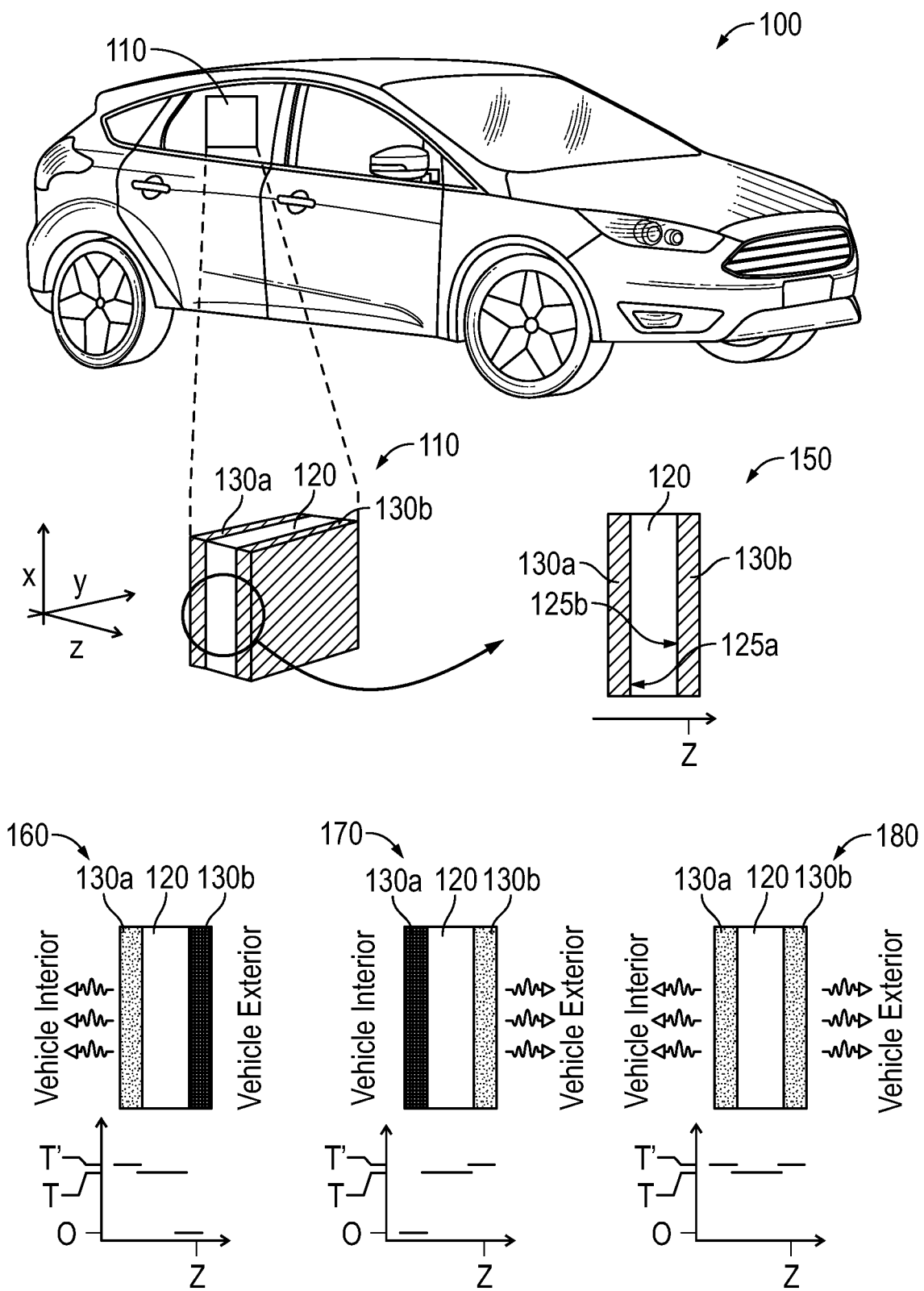
FIG. 1 presents an example of a vehicle that utilizes a transparent display apparatus, in accordance with one or more embodiments of the disclosure.

The disclosure recognizes and addresses, among other technical challenges, the issue of displaying digital content on surfaces of a vehicle. Such an issue can arise, for example, in situations in which the operation of the vehicle requires or otherwise can leverage the display of information to occupants of the vehicle and pedestrians and/or other vehicles. The information can include the digital content, such as passenger entertainment, safety indicia for an operator of the vehicle, other safety indicia for other road users, advertisements, a combination thereof, or the like. Using a surface of the vehicle for presenting such information poses several technical challenges.

The disclosure provides technologies for displaying digital content on surfaces of a vehicle. The digital content can include entertainment; journey information; environment information (landmark information, road conditions, traffic conditions, weather conditions, etc.); advertisements; notification(s) for pedestrians; notification(s) for first responders; a combination thereof; or the like. These technologies, individually or in combination, permit presenting digital content and configuring the direction of presentation of the digital content on a surface that separates an interior region from an exterior region of the vehicle. A specific direction can be configured based on numerous factors, such as operating conditions of the vehicle and intended recipient of the defined digital content. The configuration of the direction of presentation is reversible. Thus, a current direction of presentation can be reconfigured in a new direction of presentation, without structural changes to an underlying display apparatus utilized for content presentation. In one configuration, the direction of presentation extends from such a surface towards the interior region of the vehicle; thus, the direction of presentation can be referred to as an interior-facing direction. In another configuration, the direction of presentation extends from the surface towards the exterior region of the vehicle; thus, the direction of presentation can be referred to as an exterior-facing direction. At least some of the technologies disclosed herein permit or otherwise facilitate enhancing visual contrast and/or image performance in most, if not all, ambient lighting conditions.

In order to present the digital content and configure the direction of presentation, the technologies disclosed herein leverage assemblies of transparent display units and switchable layers. A switchable layer in this disclosure is a solid layer that can reversibly transition between an opaque state and a transparent state in response to an applied electric field. As an illustration, an opaque state can have an optical transmittance that is less than about 10% for each one (or at least a group) of wavelengths in the interval from about 400 nm to about 800 nm. In turn, a transparent state can have an optical transmittance that is greater than about 90% for each one (or at least a group) of wavelengths in such an interval. Other suitable values of transmittance also can define an opaque state and yet other suitable values can define a transparent state. Those other values can be determined by operational conditions of the switchable layer, such as ambient light condition. In some instances, to enhance safety, for example, the switchable layers can be designed to be in the transparent state by default in case of layer failure. A display assembly can be integrated into a single hardware component that can be assembled into the vehicle. The display assembly can be functionally coupled to a control unit that can control the operation of a transparent display unit. The control unit also can reversibly configure a state of a switchable layer integrated into the display assembly. The state can be one of a transparent state or an opaque state. Configuration of a defined state of the switchable layer can be a defined direction of presentation of content in the display assembly. The control unit can electrically control the transition of the switchable layer from a current state to the defined state. The transparent display unit and the switchable layer can be controlled individually.

The control unit also can control the presentation of digital content in respective transparent display units included in a display assembly. As such, the control unit can configure display parameters of each transparent display unit within a display assembly. Such parameters include, for example, brightness, white balance, saturation, and contrast output level. A group of display parameters can be adjusted or otherwise configured in response to a change in the direction of presentation, e.g., a change from the interior-facing direction to an exterior-facing direction or vice versa.

In some instances, instead of configuring the entire switchable layer in the defined state, the control unit can configure multiple sections of the switchable layer in respective defined states. In those instances, the display assembly can provide multiple display sections that can be coordinated with the multiple sections of the switchable layer to present respective display contents for different presentation directions. Such configuration and sectioning can allow, for example, visibility during specific vehicle states (e.g., a parking maneuver, a collision avoidance maneuver, an emergency condition, or the like) and can permit different presentation directions within the display assembly. Thus, in response to a vehicle transition to a defined vehicle state (e.g., initiation of a parking maneuver), the control unit can reversibly configure the switchable layer in defined states corresponding to respective sections of the switchable layer. In further response to the vehicle transition, the control unit can control presentation of respective digital content in at least one of the multiple display zones. Not only do commonplace technologies fail to reversibly partition in sections of the display surface available in a vehicle, but commonplace technologies also fail to provide section-specific digital content in a section-specific presentation direction in response to a particular vehicle state.

As is described in greater detail below, some embodiments of the disclosure include display apparatuses and techniques that, individually or in combination, permit the presentation of digital content and the configuration of the direction in which the digital content is presented. In some embodiments, a display apparatus includes a display assembly having a transparent display unit intercalated between a first switchable layer and a second switchable layer. As such, the first switchable layer and the second switchable layer are assembled in opposition to one another, and form respective interfaces with the transparent display unit. The transparent display unit can rely on transparent liquid crystal display (LCD) technology, organic LED (OLED) transparent display technology, or any other types of transparent display technologies.

The display apparatus also includes a control unit. The control unit can operate the transparent display unit and also can reversibly configure respective states of the first switchable layer and the second switchable layer, to reversibly configure a particular direction of presentation of digital content. Each one of the first switchable layer and the second switchable layer can be configured independently from the operation of the transparent display unit. The control unit also can control the presentation of digital content on the transparent display unit.

In some instances, the control unit can synchronize the reversible configuration of the respective states of the first and second switchable layers with the presentation of a specific type of content in the transparent display unit. Accordingly, the control unit can synchronize the reversible configuration of an interior-facing direction and an exterior-facing direction with the respective presentation of first digital content and second digital content. As a result, one of the first digital content or the second digital content can be perceived as being presented in a first presentation direction (either interior-facing or exterior-facing). In turn, the other one of the first digital content or the second digital content can be perceived as being presented in the opposite presentation direction. Thus, while utilizing a single transparent display unit, different types of digital content can be perceived as being concurrently presented in opposing presentation directions. In sharp contrast, commonplace technologies fail to leverage a common surface to present both interior-facing content and exterior-facing content in a vehicle.

In other embodiments, a display apparatus includes a switchable layer intercalated between a first transparent display unit and a second transparent display unit. Accordingly, the first transparent display unit and the second transparent display unit are assembled in opposition to one another, and form respective interfaces with the switchable layer. In one of those embodiments, each one of the first transparent display unit and the second transparent display unit can rely on a same transparent display technology (e.g., transparent LCD technology, OLED transparent display technology, or the like). In another one of those embodiments, the first transparent display unit can rely on a first type of transparent display technology and the second transparent display unit can rely on another type of transparent display technology. Such a heterogeneous arrangement provides greater flexibility than a homogenous display arrangement in which a single transparent display technology is utilized. The heterogeneous arrangement can provide a satisfactory (e.g., optimal or nearly optimal) experience for interior-facing display and/or exterior-facing display in a wide range of ambient conditions.

The display apparatus also includes a control unit that can configure the state of the switchable layer, to reversibly configure a particular direction of presentation of digital content. The control unit also can control the operation of the first transparent display unit and the second transparent display unit. The switchable layer can be configured independently from the operation of such display units. In addition, the operation of the first transparent display unit and the second transparent display unit can be controlled individually. The control unit also can control the presentation of respective digital content on the first transparent display unit and the second transparent display unit. In some instances, the first and second transparent display units and the switchable layer can be integrated into a single hardware component. Thus, the display apparatus can be operated as separate transparent display devices or a single transparent display apparatus. When operated as separate transparent display devices, each one of the devices can present the same digital content or different digital content.

Regardless of the structure of a display assembly, the technologies disclosed herein can present rich digital content in one or both of an interior-facing direction or an exterior-facing direction relative to a vehicle. The presentation direction can be reversibly configured based on one or more factors, such as intended use of the vehicle; state of the vehicle; condition of an occupant of the vehicle; condition of an environment of the vehicle; a combination thereof; or the like. In some situations, at least part of the digital content can be personalized to customize the appearance of at least some parts of the vehicle, or for provision of emergency information. For example, in an emergency (vehicle collision, vehicle hijacking, vehicle theft, etc.), information that identifies one or multiple occupants of the vehicle can be present in an exterior-facing direction. Other information that represents the emergency also can be presented in the exterior-facing direction or another exterior-facing direction. For instance, in the case of vehicle theft or hijacking, a display assembly incorporated into the rooftop of the vehicle can present markings (a specific color, large-font text, or the like) that conveys that the vehicle is a stolen or hijacked vehicle. As another example, personalization also can be implemented in non-emergency situations where digital content in an interior-facing direction and/or an exterior-facing direction can customize the interior appearance and exterior appearance of the vehicle.

While some embodiments of the disclosure are illustrated with reference to an automobile, the disclosure is not so limited. Indeed, the principles and practical elements disclosed herein can be applied to other types of vehicles, such as aircraft, boats, farm equipment, and so forth.

With reference to the drawings, FIG. 1 presents an example of a vehicle 100 that utilizes a display apparatus in accordance with one or more embodiments of this disclosure. Although the vehicle 100 is illustrated as an automobile, the disclosure is not limited in that respect, and other types of vehicles having a cabin can utilize the display apparatus disclosed herein. The display apparatus includes a display assembly 110 that can be embodied in or can constitute a window of the vehicle 100. The window separates a first region external to the vehicle 100 (an exterior of the vehicle 100) and a second region internal to the vehicle 100 (an interior of the vehicle 100). The interior of the vehicle 100 can include the cabin of the vehicle 100. In other embodiments, the display assembly 110 can embody, or can constitute, another type of surface (e.g., a sunroof) of the vehicle 100, where the surface separates the interior from the exterior of the vehicle 100.

The display assembly 110 includes a transparent display unit 120, such as a transparent LCD unit, a transparent OLED unit, or the like. As is illustrated in the cross-section diagram 150, the transparent display unit 120 has a first surface 125a and a second surface 125b opposite the first surface 125a. Although the first surface 125a and the second surface 125b are illustrated as planar, mutually parallel surfaces, the display technologies of the disclosure are not limited in that respect. In some embodiments, the first surface 125a can have a first curvature and the second surface 125b can have a second curvature. For instance, in a scenario in which the display assembly 110 constitutes a portion of the windshield of the vehicle 100, the transparent display unit 120 can have a curvature that conforms to the curvature of the windshield. Thus, the first surface 125a and the second surface 125b can each have such a curvature, while remaining opposite to one another.

The display assembly 110 also includes a first switchable layer 130a that forms an interface with the first surface 125a of the transparent display unit 120. To form such an interface, the first switchable layer 130a can be formed monolithically on the first surface 125a. As such, the first switchable layer 130a is solid and can have an essentially uniform thickness $t_a$. A uniform thickness refers to a thickness that is independent of the position at which the thickness is determined or otherwise probed. The thickness $t_a$ can have a magnitude in a range from a few nanometers to a few millimeters, for example. The first switchable layer 130a can reversibly transition between a first state having first optical properties and a second state having second optical properties. A reversible transition from the first state to the second state, or from the second state to the first state, can be caused by the application of an electric field across the first switchable layer 130a. To that point, the display assembly 110 can include an electrode assembly (not depicted in FIG. 1) that is functionally coupled (e.g., electrically and mechanically coupled) to the first switchable layer 130a. The electrode assembly permits the application of the electric field along a defined direction across the first switchable layer 130a.

In some embodiments, a first electrode assembly (not depicted in FIG. 1) can be integrated into the first switchable layer 130a, and a second electrode assembly (not depicted in FIG. 1) can be integrated into the second layer 130b. In some embodiments, each one of the first and second electrode assemblies can include an array of transparent conductors (TCs). In one example, the array can include a mesh having a defined size or another type of thin-film arrangement of TCs. In another example, the array can include a lattice of discrete transparent conductors assembled in a defined layout. Each one of the transparent conductors has a defined shape (e.g., an elongated slab, a circle, a square, or the like) and a defined size. The size can have a magnitude in a range from a few micrometers to several centimeters, for example. The transparent conductors can be selected, for example, from the group including NiO, zinc oxide; indium tin oxide (ITO); and a conductive polymer. Other suitable TCs can be utilized. In some embodiments, each one of the first and second electrode assemblies can include a suitable array of conductors (metals, conductive polymers, carbon-based materials, etc.), such as a nanowire mesh.

In some embodiments, the first switchable layer 130a can include an electrochromic material. The electrochromic material can be a metal oxide (e.g., $WO_3$) or an organic material (such as a conducting polymer, including polypyrrole (PPy), PEDOT, and polyaniline). The technologies disclosed herein are, of course, not limited to electrochromic materials and any suitable material that can switch from an opaque state to a transparent state can be utilized.

In the first state, in one aspect, the first switchable layer 130a has a first optical transmission spectrum for visible light—e.g., wavelengths in the visible portion of the electromagnetic (EM) radiation spectrum. In the second state, in another aspect, the first switchable layer 130a has a second optical transmission spectrum for visible light. In one example, the first optical transmission spectrum can render the first switchable layer 130a essentially opaque to visible light, whereas the second optical transmission spectrum can render the first switchable layer 130a essentially transparent. Accordingly, the first switchable layer 130a can reversibly transition between an opaque state and a transparent state. In the opaque state, the first switchable layer 130a can have a transmittance that is less than about 10% for each one (or at least a group) of EM wavelengths in the interval from about 400 nm to about 800 nm. In turn, in the transparent state, the first switchable layer 130a can have a transmittance that is greater than about 90% for each one (or at least a group) of EM wavelengths in the interval from about 400 nm to about 800 nm.

The display assembly 110 further includes a second switchable layer 130b that forms an interface with the second surface 125b of the transparent display unit 120. To form such an interface, the second switchable layer 130b can be formed monolithically on the second surface 125b. As such, the second switchable layer 130b is solid and can have an essentially uniform thickness $t_b$. The thickness $t_b$ can have a magnitude in a range from a few nanometers to a few millimeters, for example. The second switchable layer 130b also can reversibly transition between a first state having first optical properties and a second state having second optical properties. A reversible transition from the first state to the second state, or from the second state to the first state, also can be caused by the application of an electric field across the second switchable layer 130b. Again, the display assembly 110 can include an electrode assembly (not depicted in FIG. 1) functionally coupled (e.g., electrically and mechanically coupled) to the second switchable layer 130b. The electrode assembly permits the application of the electric field along a defined direction across the second switchable layer 130b. In some embodiments, the second switchable layer 130b can include an electrochromic material. The electrochromic material can be a metal oxide (e.g., $WO_3$) or an organic material (such as a conducting polymer, including polypyrrole (PPy), PEDOT, and polyaniline). The technologies disclosed herein are, of course, not limited to electrochromic materials and any suitable material that can switch from an opaque state to a transparent state can be utilized.

In the first state, in one aspect, the second switchable layer 130b has a first optical transmission spectrum for visible light. In the second state, in another aspect, the second switchable layer 130b has a second optical transmission spectrum for visible light. In one example, the first optical transmission spectrum can render the second switchable layer 130b essentially opaque to visible light, whereas the second optical transmission spectrum can render the first switchable layer 130a essentially transparent. Accordingly, the second switchable layer 130b can reversibly transition between an opaque state and a transparent state. In the opaque state, the second switchable layer 130b can have a transmittance that is less than about 10% for each one (or at least a group) of EM wavelengths in the interval from about 400 nm to about 800 nm. In turn, in the transparent state, the second switchable layer 130b can have a transmittance that is greater than about 90% for each one (or at least a group) of EM wavelengths in the interval from about 400 nm to about 800 nm.

It is noted that in FIG. 1, the first switchable layer 130a and the second switchable layer 130b are depicted as being of the same type and having the same thickness simply for the sake of simplicity. The disclosure is not limited in that respect. In some embodiments, the first switchable layer 130a and the second switchable layer 130b can be formed from the same electrochromic material. In other embodiments, the first switchable layer 130a can be formed from an electrochromic material and the second switchable layer 130b can be formed from a different electrochromic material.

Figure 2:
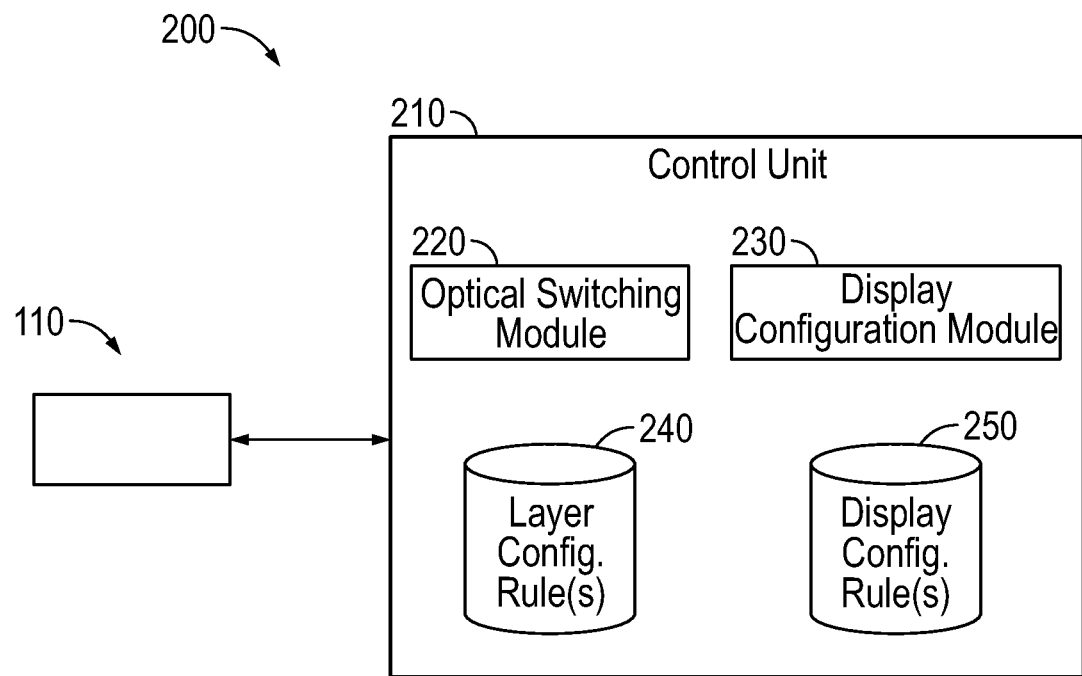
FIG. 2 presents an example of a transparent display apparatus, in accordance with one or more embodiments of the disclosure.

Regardless of the type of material and thickness of each one of the first switchable layer 130a and the second switchable layer 130b, the display assembly 110 can be configured in four different display modes. Each one of the modes corresponds to a particular arrangement of the electric field applied to one or both of the first switchable layer 130a or second switchable layer 130b. Each mode can be characterized by a composite index $\Sigma=(\sigma,\sigma^1)$, where $\sigma$ represents the state of the first layer 130a and $\sigma^1$ represents the state of the second layer 130b. Parameters $\sigma$ and $\sigma^1$ can each adopt two values: O for an opaque state and T for a transparent state. Therefore, the four different modes of the display assembly 110 are $\Sigma_o=(O,O)$, $\Sigma_i=(T,O)$, $\Sigma_e=(O,O)$, and $\Sigma_s=(T,T)$. In some embodiments, as is illustrated in FIG. 2, a control unit 210 functionally coupled to the display assembly 110 can configure the respective states of the first switchable layer 130a and the second switchable layer 130b. To that end, in some instances, the control unit 210 can include an optical switching module 220 that can cause one or several electrode assemblies (not depicted in FIG. 2) to apply electric field(s) to the first switchable layer 130a and the second switchable layer 130b. The optical switching module 220 can configure a state of one of the switchable layers 130a or 130b according to one or more configuration rules. The layer configuration rule(s) 240 can be retained in one or more memory devices.

With further reference to FIG. 1, diagram 160 depicts the $\Sigma_i=(T,O)$ display mode. This display mode can be referred to as an interior-facing mode. In such a display mode, the direction of presentation of digital content is in an interior-facing direction. Thus, the digital content presented in the transparent display unit 120 can be viewed mostly, if not exclusively, from the interior of the vehicle 100. The digital content that is presented is depicted with a trio of wavy arrows. Such a display mode can be configured in scenarios in which visibility through the display assembly 110 is not needed, as may be the case in some autonomous modes and/or when the vehicle is stationary. The opacity of the second switchable layer 130b can render the $\Sigma_i$ mode advantageous to support, for example, police vehicle activities, video conferencing, passenger entertainment, journey status, social networking functions, therapeutic/ambient lighting, and combinations thereof, and the like. In some instances, the control unit 210 can configure the second switchable layer 130b (exterior-facing switchable layer) in an opaque state in order to hide interior content from pedestrians and/or block exterior light from washing out the interior display content. The control unit 210 also can configure parameters of the transparent display unit 120, such as contrast, saturation, brightness, etc., which can be optimized for the state of the opaque layer in addition to interior needs and content. To that end, in some embodiments, the control unit 210 includes a display configuration module 230 (FIG. 2) that can utilize one or more display configuration rules 250 to configure a defined set of display parameters. The display configuration rule(s) 250 can be retained in one or more memory devices. A configured display parameter can correspond to the transparent display unit 120 as a whole or to a section of the transparent display unit 120.

Diagram 170 in FIG. 1 pictorially represents the $\Sigma_e=(O,T)$ display mode. This display mode can be referred to as an exterior-facing mode. In such a display mode, the direction of presentation of digital content is in an exterior-facing direction. Thus, the digital content presented in the transparent display unit 120 can be viewed mostly, if not exclusively, from the exterior of the vehicle 100. The digital content that is presented is depicted with a trio of wavy arrows. The exterior-facing mode can be configured in scenarios in which communication with pedestrians and/or others outside the vehicle 100 is necessary or otherwise desirable. Such a mode can be utilized to present advertisements, for example. Again, the optical switching module 220 can configure the exterior-facing mode, using in some cases, at least one configuration rule retained in the layer configuration rule(s) 240.

The opacity of the second switchable layer 130b can visually isolate an occupant of the vehicle 100, which can reduce visual noise and/or other distractions originating in the exterior of the vehicle 100. In some embodiments, the vehicle 100 can include an ambient light sensor device (not depicted in FIG. 1) that can permit or otherwise facilitate, for example, adjusting the brightness level of the transparent display unit 120 to fit different ambient light levels under different weather conditions.

Diagram 180 in FIG. 1 depicts the $\Sigma_s=(T,T)$ display mode. This display mode can be referred to as a see-through mode. In such a display mode, images that have reflection symmetry relative to a plane that is contained in the transparent display unit 120 and that separates the interior from the exterior of the vehicle 100 can be displayed on the transparent display unit 120. Such images can include, for example, an emoji, a weather icon, and the like. Such a display mode can permit or otherwise facilitate using the transparent display assembly 110 as a see-through display assembly. Furthermore, this display mode can permit or otherwise facilitate presenting augmented reality (AR) content where information can be displayed to provide information about the surroundings of the vehicle 100, for example.

In some embodiments, the optical switching module 220 can configure a switchable layer included in the display assembly 110 in zones having respective states (opaque state or transparent state). Thus, rather than configuring the switchable layer in a defined state across the entire span of the display assembly 110, the optical switching module 220 can electrically control the switchable layer to be in the defined state in specific sections of the entire span of the display assembly 110. Accordingly, the optical switching module 220 can cause an electrode assembly (not depicted in FIG. 2) to apply multiple electric fields in respective directions in the orthogonal coordinate system (x,y,z) depicted in FIG. 1. In one of such embodiments, a first section and a second section of the transparent display unit 120 can be concurrently used as an interior-facing display and an exterior-facing display, respectively.

In some embodiments, visibility can be maintained as needed or otherwise desired in portions of a vehicle window that includes the display assembly 110. In one example, a display assembly 110 can be arranged at or near the top of the rear window of the vehicle 100. Reverse parking aid warnings can be presented in a transparent display unit 120 so that the warnings are visible in a rearview mirror of the vehicle 100 while maintaining the majority of the rear window transparent. In addition, or in another example, a display assembly 110 can be arranged in a portion of the windshield of the vehicle 100, near a location of a rearview mirror of the vehicle 100. Rearview camera image frames can be presented in a transparent display unit 120 while maintaining portions of the windshield transparent to monitor the lateral movement of the front corners of the vehicle 100.

Figure 3:
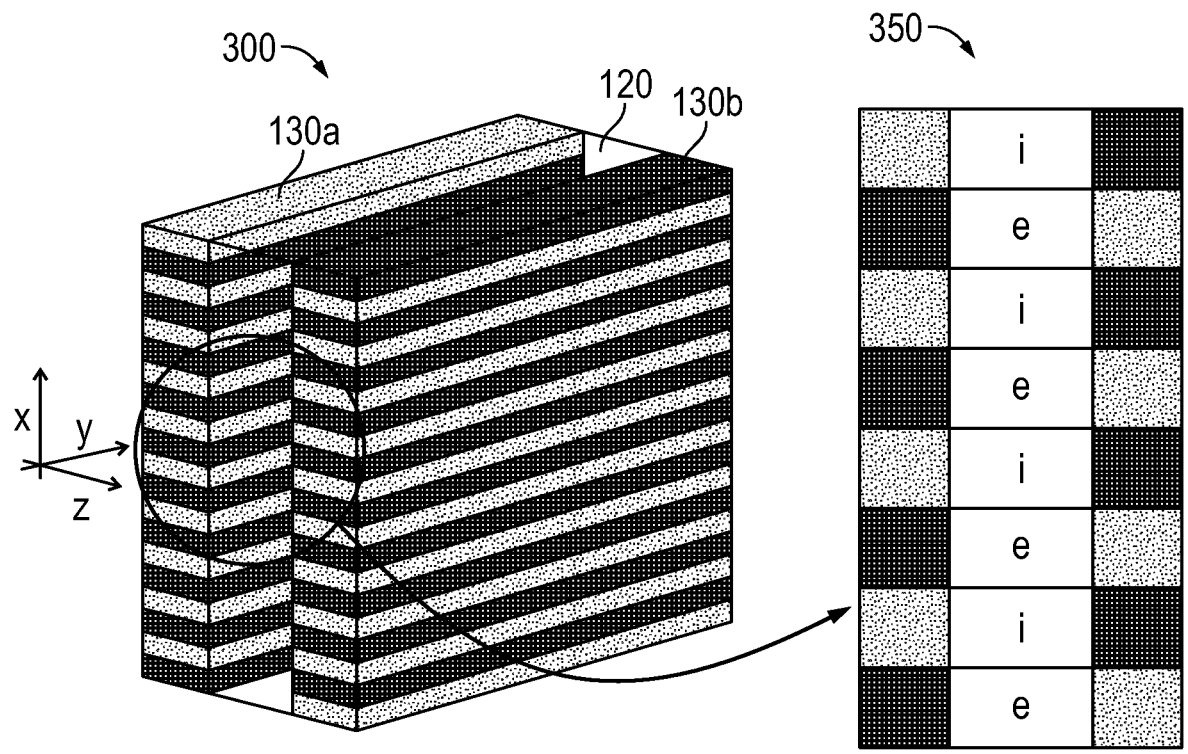
FIG. 3 presents another example of a transparent display apparatus, in accordance with one or more embodiments of the disclosure.

In some instances, it can be desirable to essentially concurrently display, on the display assembly 110, digital content intended for exterior-facing consumption and other digital content intended for interior-facing consumption. To that end, since there is a single transparent display unit 120, the optical switching module 220 and the display configuration module 230 can coordinate the configuration of states (e.g., opaque states and transparent states) in respective defined sections of a switchable layer with the presentation of specific content in the respective defined sections. The respective states of adjacent defined sections can alternate across the switchable layer. Specifically, a first section of the respective sections can be configured in a state $\sigma$ (O or T) and a second section of the respective sections can be configured in a state $\sigma^1$ (T or O). The second section is adjacent to the first section. In some embodiments, as is illustrated in FIG. 3, each one of the respective sections can correspond to an elongated slab (also referred to as a line). The elongated slab can have numerous sizes. For example, a longitudinal length of the elongated slab can have a magnitude in a range from a few millimeters to tens of centimeters. In turn, a transversal length of the elongated slab can have a magnitude in a range from a few micrometers to a few millimeters. In other embodiments, each one of the respective sections can correspond to a confined section (such as a cube or parallelepiped; also referred to as a dot) of the switchable layer. Typical lengths that define the confined section can range from a few micrometers to a few millimeters.

As an illustration, the first switchable layer 130a can be partitioned in first elongated slabs indexed sequentially with a natural number. The second switchable layer 130b can be partitioned in second elongated slabs that are essentially aligned with the first elongated slabs in the first switchable layer 130a. The optical switching module 220 can configure even-index first elongated slabs in an opaque state, and can further configure odd-index first elongated slabs in a transparent state. In addition, the optical switching module 220 can configure even-index second elongated slabs in a transparent state, and can further configure odd-index second elongated slabs in an opaque state. See diagram 300 in FIG. 3.

In such a configuration, the display configuration module 230 can partition the transparent display unit 120 into elongated slabs, each indexed with a natural number. The display configuration module 230 can cause even-index slabs of the transparent display unit 120 to present exterior-facing content (represented with a letter "e" in diagram 350 in FIG. 3). Further, the display configuration module 230 can cause odd-index lines of the transparent display unit 120 to present interior-facing content (represented with a letter "i" in diagram 350 in FIG. 3).

Therefore, by applying a position-dependent configuration of opaque states and transparent states, the display assembly 110 can leverage a single transparent display unit 120 to present one type of digital content to the interior of the vehicle 100 and another type of digital content to the exterior of the vehicle 100.

Figure 4:
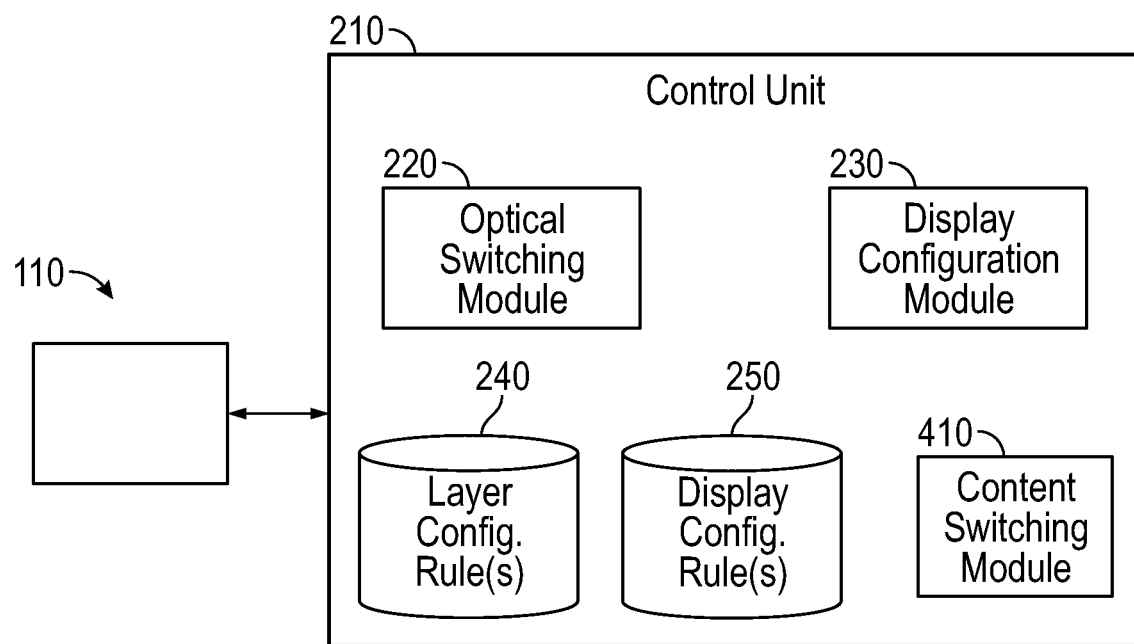
FIG. 4 presents an example of a reversible configuration of a display assembly that can be in a transparent display apparatus, in accordance with one or more embodiments of the disclosure.

In addition, or in other embodiments, the transparent display unit 120 can be directed to switch between presenting interior-facing digital content and exterior-facing digital content. The content presentation switching is performed at a defined rate, such as a defined refresh rate (30 Hz, 60 Hz, 120 Hz, 240 Hz, or the like). The content presentation switching also is performed in synchronization with the transitioning between opaque states and transparent states of both the first switchable layer 130a and the second switchable layer 130b. To implement the content presentation switching, the control unit 210 can include a content switching module 410, FIG. 4. The content switching module 410 can cause the transparent display unit 120 to switch between exterior-facing digital content and interior-facing digital content. The optical switching module 220 can cause each one of the first switchable layer 130a and the second switchable layer 130b to transition between opaque states and transparent states at the defined rate.

Figure 5:
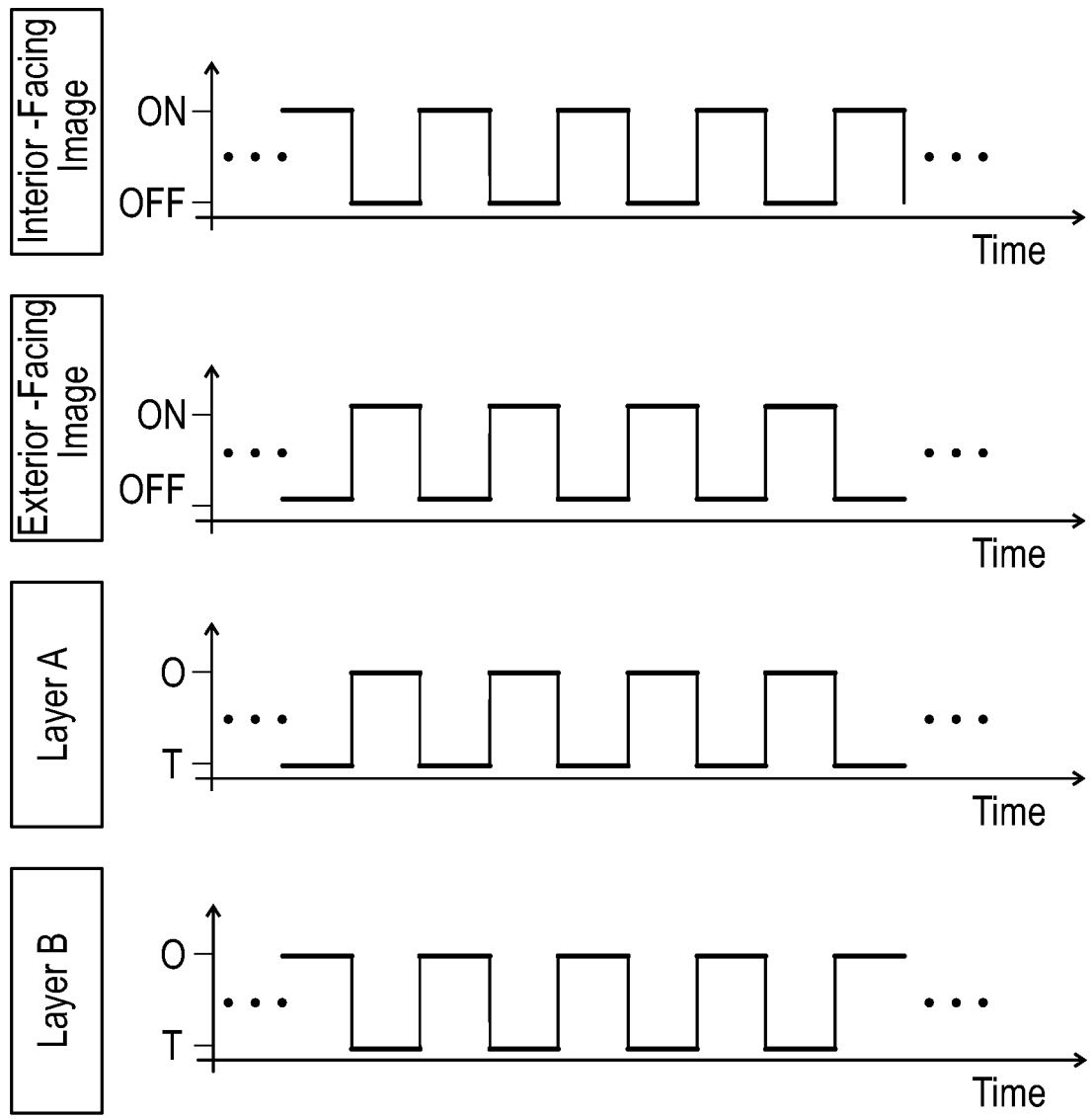
FIG. 5 presents an example of synchronization of transitions between transparent and opaque states and presentation of content in a transparent display apparatus, in accordance with one or more embodiments of the disclosure.

More specifically, as an example, the content switching module 410 can cause the transparent display unit 120 to present an exterior-facing image frame at a rate of 30 Hz while the optical switching module 220 configures the display assembly 110 in the $\Sigma_i=(T,O)$ display mode at the same rate. In between exterior-facing image frames, the content switching module 410 can cause the transparent display unit 120 to present an interior-facing image frame while the optical switching module 220 configures the display assembly 110 in the $\Sigma_e=(O,T)$ display mode. In some embodiments, to reduce noise between exterior and interior images, for example, either opaque or transparent frames can be interposed between image frames. FIG. 5 illustrates an example of this implementation.

Figure 6:
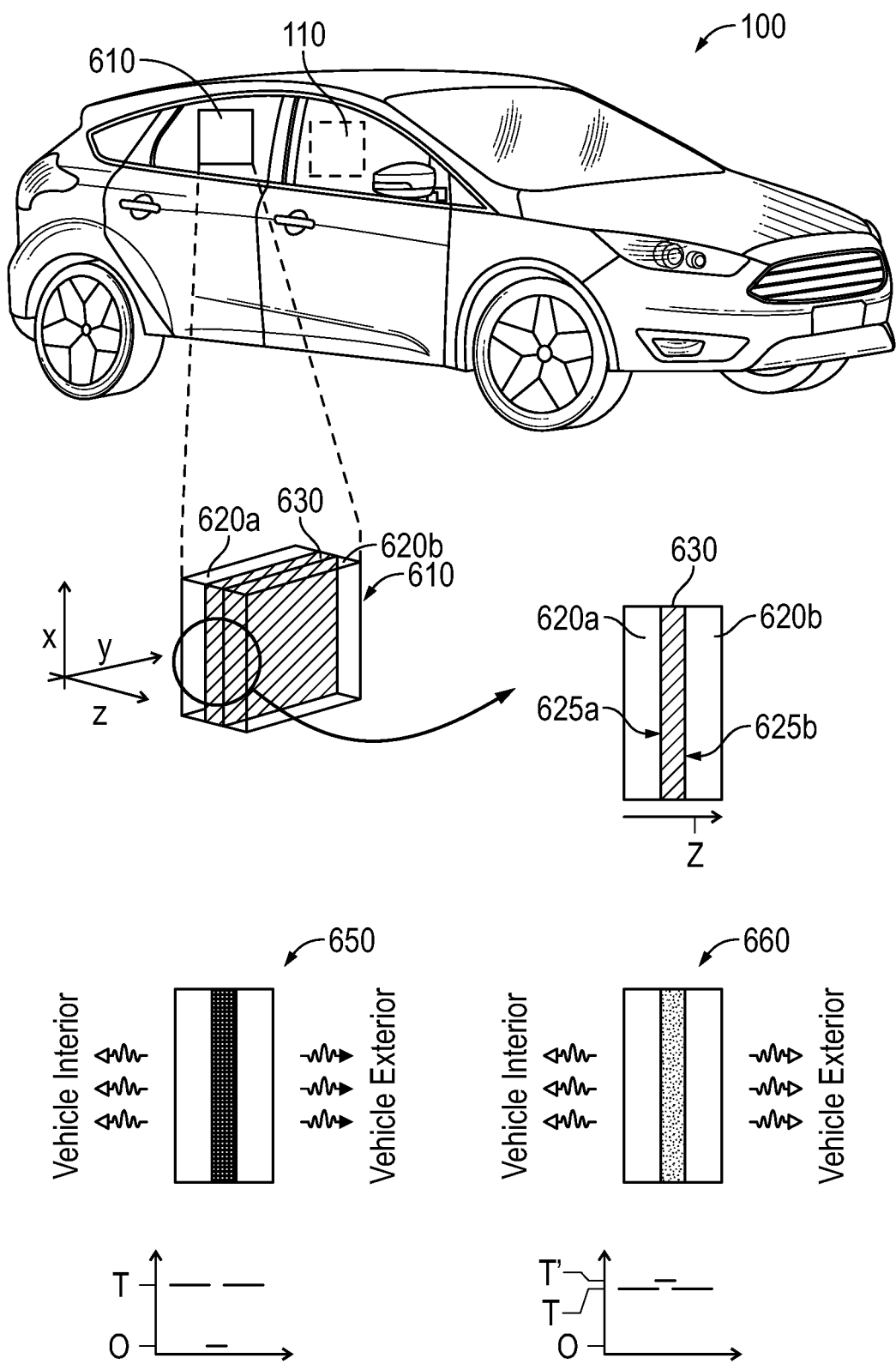
FIG. 6 presents another example of a vehicle that utilizes a transparent display apparatus, in accordance with one or more embodiments of the disclosure.

The display technologies disclosed herein are not limited to display assemblies having the structure of the display assembly 110 illustrated in FIG. 1. In some embodiments, in addition or as an alternative to the display assembly 110, the vehicle 100 can include a display assembly 610 as is illustrated in FIG. 6. The display assembly 610 includes a first transparent display unit 620a and a second transparent display unit 620b. Each one of the first transparent display unit 620a and the second transparent display unit 620b can be, for example, a transparent LCD unit, an OLED transparent display unit, or the like. In some embodiments, the first and second transparent display units 620a and 620b can be based on the same transparent display technology. In other embodiments, the first and second transparent display units 620a and 620b can be based on respective different transparent display technologies. Therefore, the transparent display technologies utilized in the display assembly 610 can be selected to achieve satisfactory (e.g., optimal or nearly optimal) performance in a particular scenario based on a combination of factors, such as power consumption, luminosity, color gamut, heat output, contrast, refresh rate, saturation, and the like.

Additionally, or in some embodiments, the first transparent display unit 620a and the second transparent display unit 620b can be configured, via the display configuration module 230, for example, in coordination with each other to enhance visual impact by improving specific brightness, saturation, contrast, and the like. Furthermore, or in yet other embodiments, the first transparent display unit 620a and the second transparent display unit 620b also can be controlled to give the content added dimension, leveraging the arrangement and operation of such units on different planes. For example, the first transparent display unit 620a and the second transparent display unit 620b can be controlled (via the display configuration module 230, for example) to produce a stereographic presentation of digital content, causing the digital content to be perceived as three-dimensional (3D) content. To that end, the first transparent display unit 620a can present a version of the digital content from a first vantage point and the second transparent display unit 620b can present another version of the digital content from a second vantage point slightly different (e.g., about one degree offset) from the first vantage point. Further, in one example, the stereographic presentation can be achieved by utilizing light of different polarizations for presenting respective versions of digital content. In another example, the stereographic presentation can be achieved by incorporating respective parallax screens into the first transparent unit 620a and the second transparent unit 620b. Parallax screens can permit auto stereographic presentation.

The display assembly 610 also includes a switchable layer 630 intercalated between the first transparent display unit 620a and the second transparent display unit 620b. In some embodiments, the switchable layer 630 can have an essentially uniform thickness t. The thickness t can have a magnitude in a range from a few nanometers to a few millimeters, for example. The switchable layer 630 can reversibly transition between a first state having first optical properties and a second state having second optical properties. A reversible transition from the first state to the second state, or from the second state to the first state, can be caused by the application of an electric field across the switchable layer 630. To that point, the display assembly 610 can include an electrode assembly (not depicted in FIG. 6) that permits the application of the electric field along a defined direction across the switchable layer 630. In some embodiments, the switchable layer 630 can include an electrochromic material.

In some embodiments, the electrode assembly (not depicted in FIG. 1) can be integrated into the switchable layer 630. In some embodiments, the electrode assembly can include an array of transparent conductors (TCs). In one example, the array can include a mesh having a defined size or another type of thin-film arrangement of TCs. In another example, the array can include a lattice of discrete transparent conductors assembled in a defined layout. Each one of the transparent conductors has a defined shape (e.g., an elongated slab, a circle, a square, or the like) and a defined size. The size can have a magnitude in a range from a few micrometers to several centimeters, for example. The transparent conductors can be selected, for example, from the group including zinc oxide; indium tin oxide (ITO); and a conductive polymer. Other suitable TCs can be utilized. In some embodiments, the electrode assembly can include a suitable array of conductors (metals, conductive polymers, carbon-based materials, etc.), such as a nanowire mesh.

In such a first state, in one aspect, the switchable layer 630 has a first optical transmission spectrum for visible light. In the second state, in another aspect, the switchable layer 630 has a second optical transmission spectrum for visible light. In one example, the first optical transmission spectrum can render the switchable layer 630 essentially opaque to visible light, whereas the second optical transmission spectrum can render the switchable layer 630 essentially transparent. Accordingly, the switchable layer 630 can reversibly transition between an opaque state (O) and a transparent state (T). In the opaque state, the switchable layer 630 can have a transmittance that is less than about 10% for each one (or at least a group) of EM wavelengths in the interval from about 400 nm to about 800 nm. In turn, in the transparent state, the switchable layer 630 can have a transmittance that is greater than about 90% for each one (or at least a group) of EM wavelengths in the interval from about 400 nm to about 800 nm.

The switchable layer 630 forms an interface with a surface 625a of the first transparent display unit 620a. The switchable layer 630 also forms an interface with a surface 625b of the second transparent display unit 620b. As is illustrated in FIG. 6, the surface 625a and the surface 625b are opposite to each other. To form such an interface, a portion of the switchable layer 630 and another portion of the switchable layer 630 can be formed separately on the surface 625a and the surface 625b. Each one of such portions can be formed monolithically. The coated first transparent display unit 620a and the coated second transparent display unit 620b can then be integrated into the display assembly 610.

Similar to other display technologies disclosed herein, the display assembly 610 is not limited to the surface 625a and the surface 625b being planar, mutually parallel surfaces. In some embodiments, the surface 625a can have a first curvature and the surface 625b can have a second curvature. For instance, in a scenario in which the display assembly 610 constitutes a portion of the windshield of the vehicle 100, at least one (or, in some instances, both) of the first transparent display unit 620a or the second transparent display unit 620b can have a curvature that conforms to the curvature of the windshield. Thus, the surface 625a and the surface 625b can each have such a curvature, while remaining opposite to one another.

Diagram 650 in FIG. 6 depicts an opaque display mode of the display assembly 610. In such a display mode, different digital content can be presented on the first transparent display unit 620a and the second transparent display unit 620b. Thus, in such a mode, the display assembly 610 can be utilized as two separate display apparatuses: a first display apparatus including the first transparent display unit 620a and a second display apparatus including the second transparent display unit 620b.

As is illustrated in FIG. 6, in some embodiments, the first transparent display unit 620a can present digital content directed to the interior of the vehicle 100; such content is depicted with a trio of wavy arrows having open arrowheads. In addition, the second transparent display unit 620b can present content directed to the exterior of the vehicle 100; such content is depicted with another trio of wavy arrows having solid arrowheads. Thus, the first display apparatus and the second display apparatus can serve, respectively, as an interior-facing display and an exterior-facing display. In some scenarios, the interior-facing display can present several types of digital content for an occupant of the vehicle 100, such as passenger entertainment, journey status, a combination of both, or the like. In addition, the exterior-facing display can present several other types of digital content, such as pedestrian communication(s), directed content (e.g., advertisement), a combination of both, or the like. In some instances, the interior-facing display and the exterior-facing display can be operated nearly simultaneously, presenting digital content consumed inside the vehicle 100 and digital content consumed outside the vehicle 100.

The opaque display mode can provide privacy in the consumption of digital content. For example, the switchable layer 630 in the opaque state can occlude digital content, avoiding the snooping of the digital content from the opposite side of the display assembly 610. In addition, or as another example, the switchable layer 630 in the opaque state can provide privacy for occupant(s) of the vehicle 100.

In some embodiments, the vehicle 100 can include more than one display assembly 610. For example, each one of the windows and the windshield of the vehicle 100 can include a display assembly 610. The optical switching module 220 can configure, in some instances, each one of the many display assemblies 610 in the opaque display mode in order to render the interior of the vehicle 100 non-viewable from any side of the vehicle 100.

In addition, or in other embodiments, the optical switching module 220 can configure a subset of the many display assemblies 610 in the opaque display mode. In some instances, one of the display assemblies 610 in such a subset can be configured in an opaque display mode in order to block light that may be entering the vehicle 100. For example, if the sun is low on a first side of the vehicle 100 while a display assembly 610 on an opposite, second side of the vehicle 100 is active, a display assembly 610 constituting a first window on the first side can be darkened so that an occupant (or possibly someone outside if system is in a transparent mode) can more easily read or otherwise consume digital content presented in an interior-facing transparent display unit integrated in such a display assembly 610. The optical switching module 220 can cause the darkening by causing a switchable layer 630 integrated into the display assembly 610 to transition from a current state to an opaque state. The rule (or trigger) for darkening additional windows can be defined at least in terms of the display surface orientation (e.g., interior-facing or exterior-facing); time of day; weather conditions; ambient light sensor level; a combination thereof; and the like. In some embodiments, the rule can be retained in the layer configuration rule(s) 240 (see FIG. 2, for example).

Two or more of the many display assemblies 610 also can be controlled in coordination around the vehicle 100 to produce other effects besides 3D presentation. For instance, the optical switching module 220 can configure a first display assembly 610 in a transparent display mode and a second display assembly 610 in an opaque display mode. In some embodiments, the first display assembly 610 and the second display assembly 610 can be adjacent to each other. One or both of the transparent display units in the first display assembly 610 can present specific digital content (e.g., a "Happy Birthday" message), and one or more of the transparent display units in the second display assembly 610 can present images of a cake with candles and balloons.

Diagram 660 in FIG. 6 depicts a transparent display mode of the display assembly 610. In such a display mode, images that have reflection symmetry relative to a plane that is contained in the switchable layer 630 and that separates the interior from the exterior of the vehicle 100 can be displayed on the first transparent display unit 620a and the second transparent display unit 620b. Such images can include, for example, an emoji, a weather icon, and the like. Furthermore, the transparent display mode can be configured, via the optical switching module 220, for example, when potential interaction between an occupant and people outside the vehicle 100 is desirable. For example, people may want to see someone's reaction when an emoji is displayed on the display assembly 610 or see a gesture from someone on the other side of the window that contains the display assembly 610.

In some embodiments, rather than configuring the entire switchable layer 630 in a defined state, the optical switching module 220 can configure the switchable layer 630 in zones having respective states (opaque state or transparent state).

Figure 7:
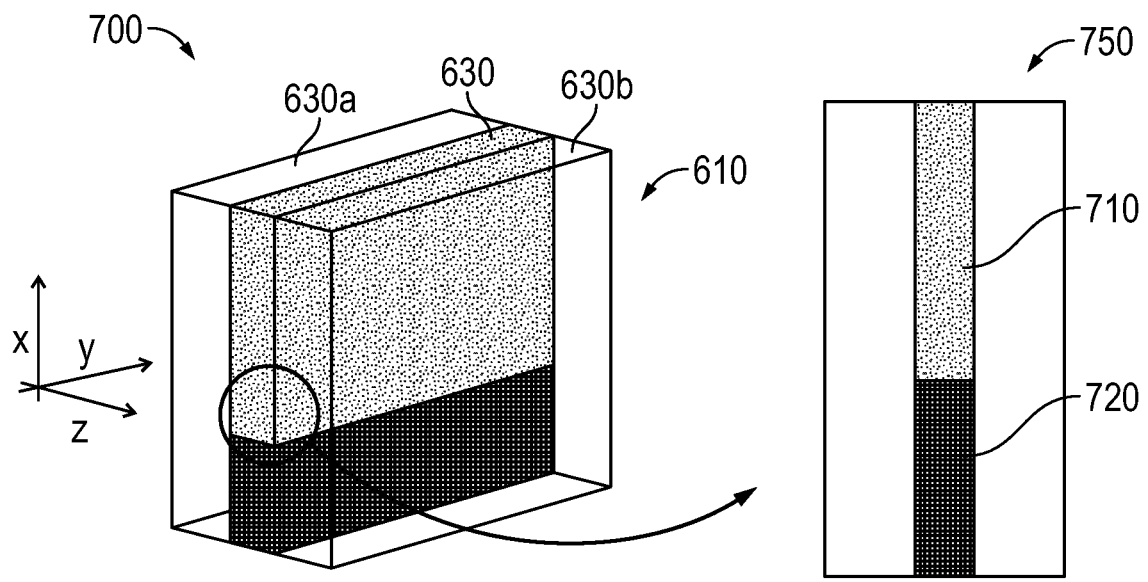
FIG. 7 presents an example of a reversible configuration of a display assembly that can be in a transparent display apparatus, in accordance with one or more embodiments of the disclosure.

As an example, FIG. 7 illustrates the configuration of the switchable layer 630 in two zones: a first zone 710 in a transparent state and a second zone 720 in an opaque state.

Numerous factors, such as financial, manufacturing, and/or robustness considerations, can determine the size and/or shape of the independently controlled zones in the switchable layer 630. In some embodiments, the optical switching module 220 and the layer configuration rule(s) 240, individually or in combination, can provide a zone management function of the layered display assembly 610 or other display assemblies described herein. For instance, at least one of the rules retained in the layer configuration rule(s) 240 can establish a type of partitioning to be implemented when configuring zones in respective states (either opaque states or transparent states). The optical switching module 220 can apply the at least one rule to configure the respective states.

Similar to other technologies disclosed herein, the display configuration module 230 can configure the presentation of digital content in the first transparent display unit 620a and/or the second transparent display unit 620b. The first transparent display unit 620a and the second transparent display unit 620b can present different images in some zone(s) to an occupant of the vehicle 100 and outside the vehicle 100 when the optical switching module 220 configures the switchable layer 630 in an opaque state in such zone(s). Meanwhile, the optical switching module 220 can configure (or, in some situations, can maintain) the other zone(s) in a transparent state in order to allow visibility and/or provide a coordinated display.

Figure 8:
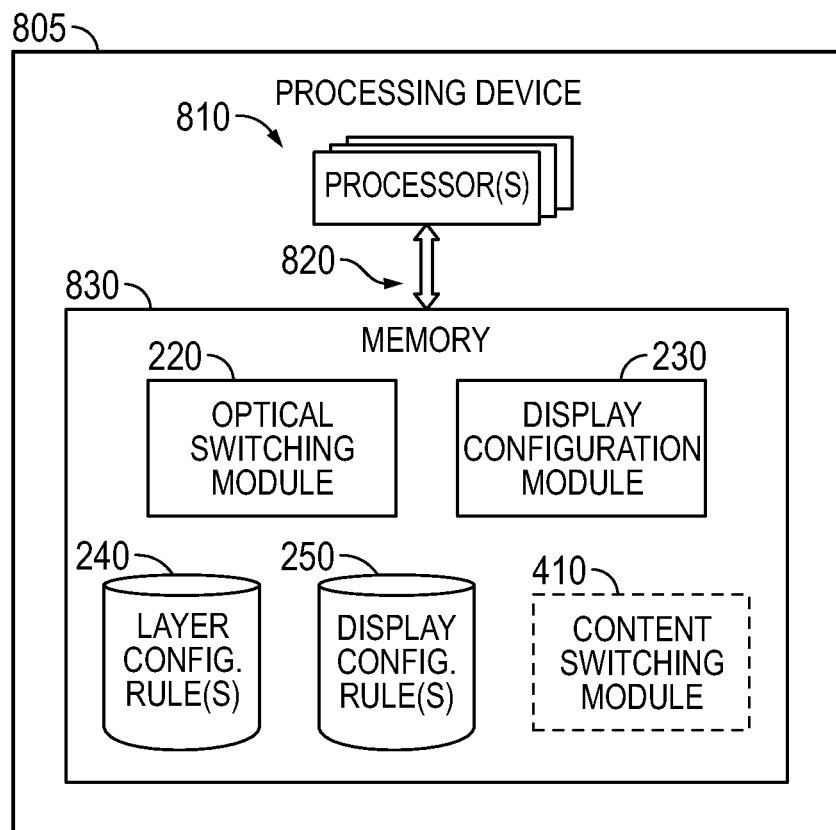
FIG. 8 presents an example of a processing device for control of a transparent display assembly, in accordance with one or more embodiments of the disclosure.

FIG. 8 is a block diagram of an example of a processing device 805 for control of a transparent display assembly, in accordance with one or more embodiments of the disclosure. The processing device 805 can embody, or can constitute, the control unit 210. The processing device 805 can include one or more processors 810 and one or more memory devices 830 (referred to as memory 830) that include machine-accessible instructions (e.g., computer-readable and/or computer-executable instructions) that can be accessed and executed by at least one of the processor(s) 810. The processor(s) 810 can be embodied in, or can include, for example, a graphics processing unit (GPU); a plurality of GPUs; a central processing unit (CPU); a plurality of CPUs; an application-specific integrated circuit (ASIC); a microcontroller; a programmable logic controller (PLC); a field programmable gate array (FPGA); a combination thereof; or the like. In some embodiments, the processor(s) 810 can be arranged in a single computing device (e.g., an electronic control unit (ECU), and in-car infotainment (ICI) system, or the like). In other embodiments, the processor(s) 810 can be distributed across two or more computing devices (e.g., multiple ECUs; a combination of an ICI system and one or several ECUs; or the like).

The processor(s) 810 are functionally coupled to the memory 830 by means of a communication architecture 820. The communication architecture 820 is suitable for the particular arrangement (localized or distributed) of the processor(s) 810. In some embodiments, the communication architecture 820 can include one or more bus architectures, such an Ethernet-based industrial bus, a controller area network (CAN) bus, a Modbus, other types of fieldbus architectures, a combination thereof, or the like.

As is illustrated in FIG. 8, the memory 830 includes the optical switching module 220, the display configuration module 230, and, optionally, the content switching module 410. Machine-accessible instructions embody or otherwise constitute each one of such modules. In some embodiments, the machine-accessible instructions are encoded in the memory 830 and can be arranged in components that can be built (e.g., linked and compiled) and retained in computer-executable form in the memory 830 (as is shown) or in one or more other machine-accessible non-transitory storage media. In other embodiments, the machine-accessible instructions can be assembled as circuitry or other types of hardware components.

At least one of the processor(s) 810 can execute, individually or in combination, the optical switching module 220, the display configuration module 230, and, optionally, the content switching module 410 to cause the processing device 805 to control a transparent display assembly in accordance with this disclosure. The memory 830 also includes layer configuration rule(s) 240 and display configuration rule(s) 250 that can be utilized, individually or in combination, as part of the execution of one or more of such modules.

While not illustrated in FIG. 8, in some embodiments, the processing device 805 also can include other types of computing resources that can permit or otherwise facilitate the execution of the one or more of the optical switching module 220, the display configuration module 230, and, optionally, the content switching module 410. The computing resources can include, for example, interface(s) (such as I/O interfaces, application programming interfaces (APIs), and/or a wireless communication adapter). In addition, or as another example, the computing resource(s) can include controller devices(s), power supplies, an operating system, firmware, a combination thereof, or the like.

Figure 8A:
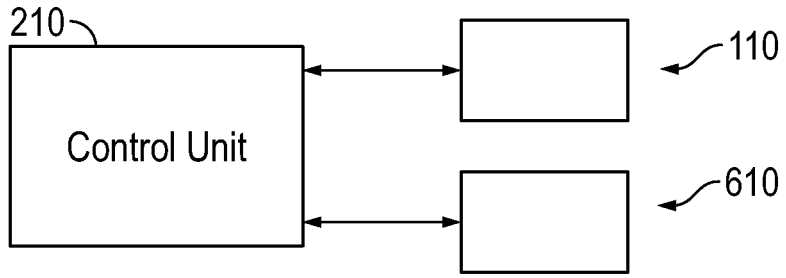
FIG. 8A presents an example of a control unit for control of transparent display assemblies, in accordance with one or more embodiments of the disclosure.

It is noted that the embodiments of the technologies disclosed herein are not limited to a single display assembly (either display assembly 110 or display assembly 610). A display apparatus in accordance with this disclosure can include, in some embodiments, more than one display assembly 110, more than one display assembly 610, or a combination of display assemblies 110 and display assemblies 610. In one example, each one of the passenger-side windows of the vehicle 100, FIG. 1, can include a display assembly 110. In another example, a passenger-side window can include a first display assembly 110 and the windshield of the vehicle 100 can include a second display assembly 110. Similarly, in some instances, each one of the passenger-side windows of the vehicle 100, FIG. 6, can include a display assembly 610. In another example, a passenger-side window can include a first display assembly 610 and the windshield of the vehicle 100 can include a second display assembly 610. As is illustrated in FIG. 8A, in embodiments in which a combination of display assemblies 110 and display assemblies 610, the control unit 210 can control each assembly in the combination.

Figure 9:
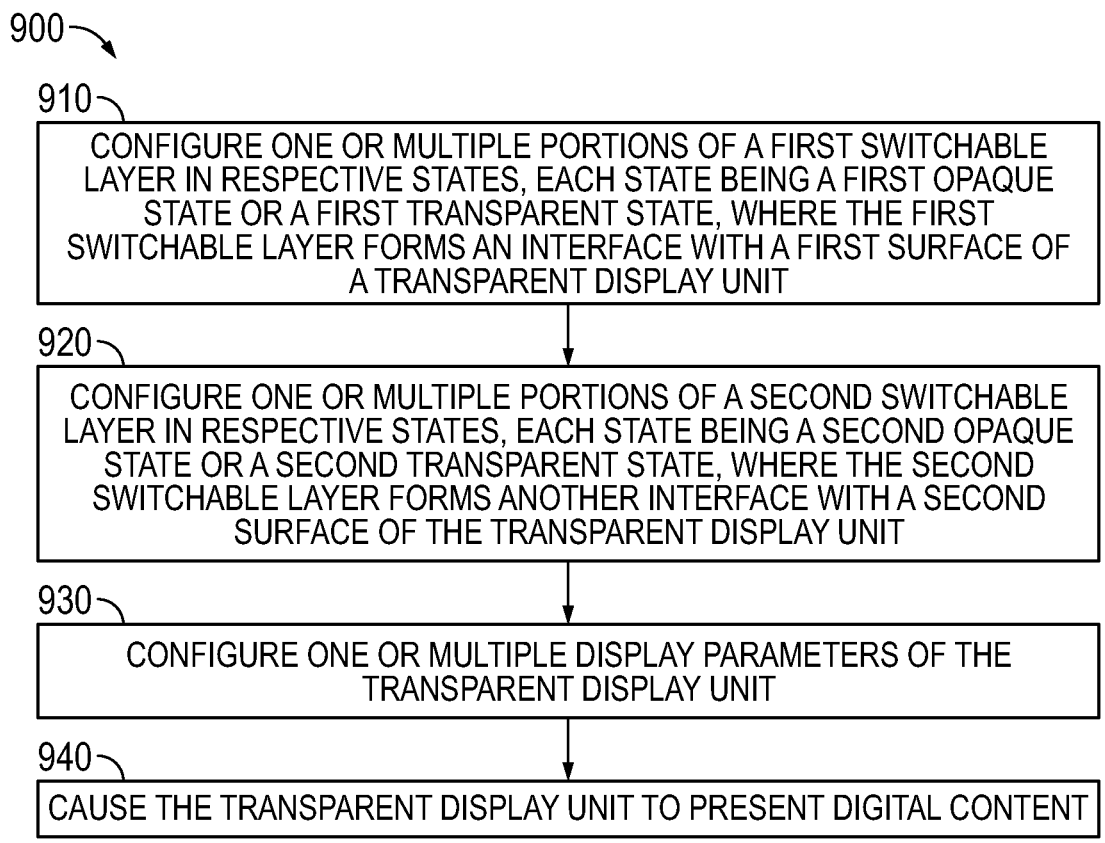
FIGS. 9-11 present respective examples of methods for displaying content on a transparent display apparatus, in accordance with one or more embodiments of the disclosure.
Figure 10:
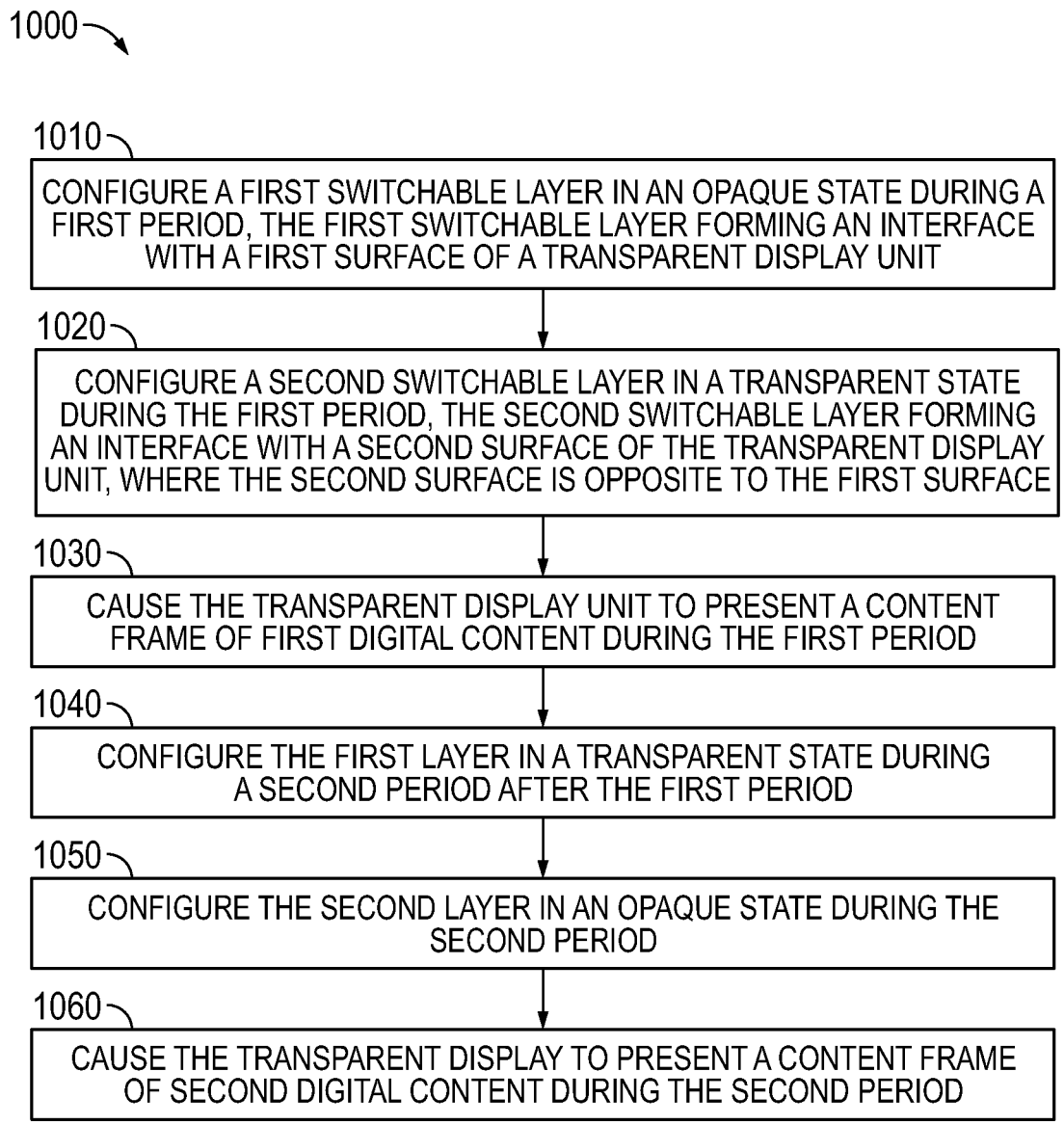
Figure 11:
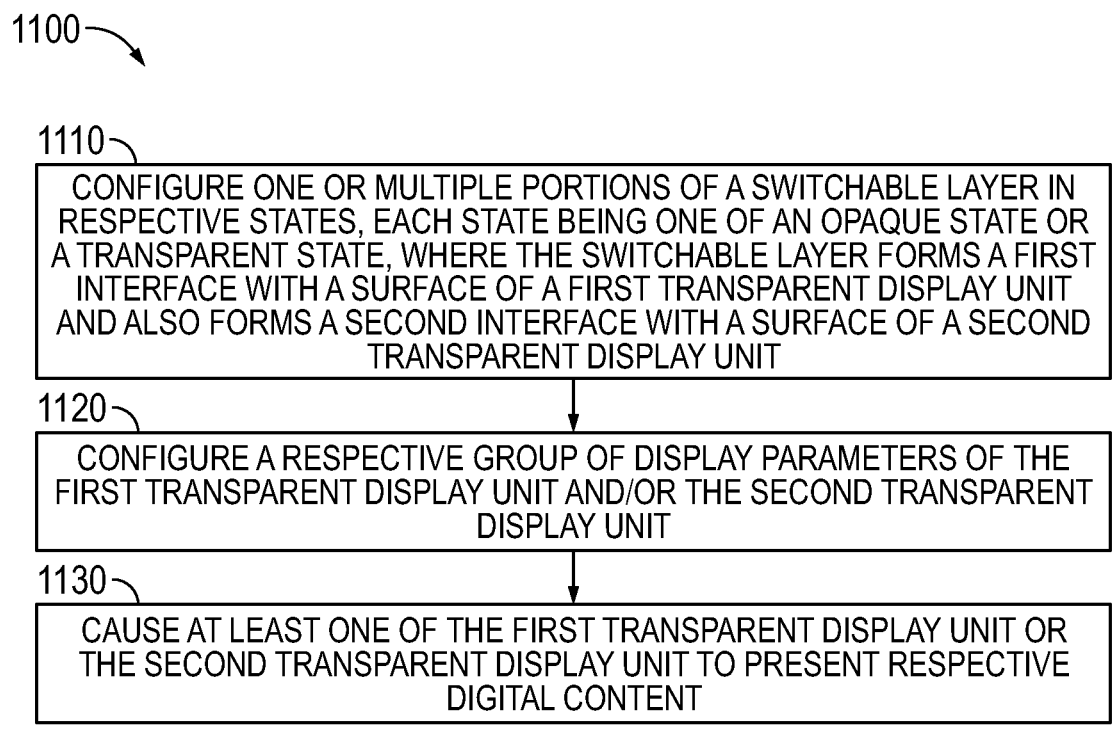

FIG. 9, FIG. 10, and FIG. 11 illustrate examples of methods that emerge from the principles of this disclosure. While the exemplified methods are presented and described as a series of acts or operations that are performed in a sequence, the disclosure is not limited in that respect. Indeed, any one of the methods disclosed herein is not limited by the order (explicit or implied) of a specific sequence of acts or operations. For example, some acts or operations can occur in a different order than what is illustrated herein. In addition, an act or operation can occur concurrently with another act or operation. Further, in some instances, not all acts or operations may be required to implement a method or group of methods disclosed herein.

In some embodiments, the acts or operations disclosed in connection with any of the techniques in accordance with this disclosure may be machine-accessible instructions that can be executed or otherwise implemented by one or many processors and/or can be stored on a computer-readable medium or media. In some embodiments, the machine-accessible instructions can include a routine, a sub-routine, programs, a thread of execution, and/or the like. In other embodiments, the machine-accessible instructions can be assembled as circuitry or other types of hardware components. Results of acts or operations of the methodologies can be stored in a computer-readable medium, displayed on a display device, and/or the like.

FIG. 9 illustrates a flowchart of an example of a method 900 for displaying content on a transparent display apparatus, in accordance with one or more embodiments of the disclosure. As is disclosed herein, the transparent display apparatus can include a display assembly and a processing device or another type of computing device. In some embodiments, the display assembly includes a first switchable layer, a second switchable layer, and a transparent display unit (e.g., transparent display unit 120). Each one of the first switchable layer and the second switchable layer can be solid and can have an essentially uniform thickness. In one example, the first switchable layer can be the layer 130a and the second switchable layer can be the layer 130b. See FIG. 1. The first switchable layer forms an interface with a first surface of the transparent display unit. The second switchable layer forms another interface with a second surface of the transparent display unit. The first surface and the second surface can be opposite to one another. The processing device or the computing device can perform, entirely or partially, the example method 900. In some embodiments, the processing unit or the computing device can embody, or can constitute, the control unit 210 described herein (see FIG. 2 or FIG. 8A).

At block 910, the processing device can configure one or multiple portions of the first switchable layer in respective states, each state being one of a first opaque state or a first transparent state. To configure a first portion of the portion(s) of the first switchable layer in the first opaque state, in some instances, the processing device can cause the first portion to transition from another transparent state to the first opaque state. In other instances, configuring such a first portion in the first opaque state can include causing the first portion to transition from another opaque state to the first opaque state. To cause either one of such transitions, the processing device can cause an electrode assembly coupled (e.g., electrically and mechanically coupled) to the first switchable layer to apply a defined electric field in a defined direction across the first portion of the switchable layer.

In addition, to configure such a first portion of the first switchable layer in the first transparent state, in some instances, the processing device can cause the first portion of the switchable layer to transition from another transparent state to the first transparent state. In other instances, configuring the first portion of the first switchable layer in the first transparent state can include causing the first portion to transition from another opaque state to the first transparent state. To cause either one of such transitions, the processing device can cause the electrode assembly coupled to the first switchable layer to apply a second defined electric field in a second defined direction across the first portion of the first switchable layer.

At block 920, the processing device can configure one or multiple portions of the second switchable layer in respective states, each state being one of a second opaque state or a second transparent state. To configure a first portion of the portion(s) of the second switchable layer in the opaque state, in some instances, the processing device can cause the first portion to transition from another transparent state to the second opaque state. In other instances, configuring such a first portion in the second opaque state can include causing the first portion to transition from another opaque state to the second opaque state. To cause either one of such transitions, the processing device can cause an electrode assembly coupled to the second switchable layer to apply a defined electric field in a defined direction across the first portion of the second switchable layer.

In addition, to configure such a first portion of the second switchable layer in the transparent state, in some instances, the processing device can cause the first portion to transition from another transparent state to the second transparent state. In other instances, configuring the first portion of the second switchable layer in the second transparent state can include causing the first portion to transition from another opaque state to the second transparent state. To cause either one of such transitions, the processing device can cause the electrode assembly coupled to the second switchable layer to apply a second defined electric field in a second defined direction across the first portion of the switchable layer.

At block 930, the processing device can configure one or multiple display parameters of the transparent display unit. As mentioned, the display parameters can include brightness, white balance, saturation, contrast output level, and the like. At block 940, the processing device can cause the transparent display unit to present digital content. The transparent display unit can present the digital content at least according to the configured display parameter(s).

FIG. 10 illustrates a flowchart of an example of a method 1000 for displaying content on a transparent display apparatus in accordance with one or more embodiments of the disclosure. As mentioned, the transparent display apparatus can include a display assembly and a processing device or another type of computing device. In some embodiments, the display assembly includes a first switchable layer, a second switchable layer, and a transparent display unit (e.g., transparent display unit 120). In one example, the first switchable layer can be the layer 130a and the second switchable layer can be the layer 130b. See FIG. 1. The first switchable layer forms an interface with a first surface of the transparent display unit. The second switchable layer forms another interface with a second surface of the transparent display unit. The first surface and the second surface can be opposite to one another. The processing device or the computing device can perform, entirely or partially, the example method 1000. In some embodiments, the processing unit or the computing device can embody, or can constitute, the control unit 210.

At block 1010, a processing device can configure the first switchable layer in an opaque state during a first period. The first switchable layer forms an interface with a first surface of a transparent display unit. Configuring the first switchable layer in the opaque state can include, in some instances, causing the first switchable layer to transition from a transparent state to the opaque state. In other instances, configuring the first switchable layer in the opaque state can include causing the first switchable layer to transition from another opaque state to the opaque state. A transition between opaque states can be implemented to refresh a specific opaque state. To cause either one of such transitions, the processing device can cause an electrode assembly coupled (e.g., electrically and mechanically coupled) to the first switchable layer to apply a defined electric field in a defined direction across the first switchable layer.

At block 1020, the processing device can configure the second switchable layer in a transparent state during the first period. The second switchable layer forms an interface with a second surface of the transparent display unit, where the second surface is opposite the first surface. Configuring the second switchable layer in the transparent state can include, in some instances, causing the second switchable layer to transition from an opaque state to the transparent state. In other instances, configuring the second switchable layer in the transparent state can include causing the second switchable layer to transition from another transparent state to the transparent state, as would be the case when the transparent state is refreshed. To cause either one of such transitions, the processing device can cause an electrode assembly coupled (e.g., electrically and mechanically coupled) to the second switchable layer to apply a defined electric field in a defined direction across the second switchable layer.

At block 1030, the processing device can cause the transparent display unit (e.g., transparent display unit 120, FIG. 1) to present a content frame of first digital content during the first period. At block 1040, the processing device can configure the first switchable layer in a transparent state during a second period after the first period. Configuring the first switchable layer in the transparent state can include causing the first switchable layer to transition from the opaque state configured at block 1010 to the transparent state. Again, to that end, the processing device can cause the electrode assembly coupled to the first switchable layer to apply a second defined electric field in a second defined direction across the first switchable layer.

At block 1050, the processing device can configure the second switchable layer in an opaque state during the second period. Configuring the second switchable layer in the opaque state can include causing the second switchable layer to transition from the transparent state configured at block 1020 to the opaque state. Again, to that end, the processing device can cause the electrode assembly coupled to the second switchable layer to apply a second defined electric field in a second defined direction across the first switchable layer. At block 1060, the processing device can cause the transparent display unit to present a content frame of second digital content during the second period.

FIG. 11 illustrates a flowchart of an example of a method 1100 for displaying content on a transparent display apparatus, in accordance with one or more embodiments of the disclosure. As is disclosed herein, the transparent display apparatus can include a display assembly and a processing device or another type of computing device. In some embodiments, the display assembly includes a first transparent display unit, a second transparent display unit, and a switchable layer intercalated between such display units. In one example, the switchable layer can be the layer 630, FIG. 6. Accordingly, the switchable layer forms a first interface with a surface of the first transparent display unit (transparent display unit 620a). In addition, the switchable layer forms a second interface with a surface of the second transparent display unit (transparent display unit 620b). The processing device or the computing device can perform, entirely or partially, the example method 1100. In some embodiments, the processing unit or the computing device can embody, or can constitute, the control unit 210.

At block 1110, the processing device can configure one or multiple portions of the switchable layer in respective states, each state being one of an opaque state or a transparent state. To configure the portion of the switchable layer in the opaque state, in some instances, the processing device can cause the switchable layer to transition from another transparent state to the opaque state. In other instances, configuring the switchable layer in the opaque state can include causing the switchable layer to transition from another opaque state to the opaque state. To cause either one of such transitions, the processing device can cause an electrode assembly coupled (e.g., electrically and mechanically coupled) to the switchable layer to apply a defined electric field in a defined direction across the switchable layer.

In addition, to configure the portion of the switchable layer in the transparent state, in some instances, the processing device can cause the switchable layer to transition from another transparent state to the transparent state. In other instances, configuring the switchable layer in the transparent state can include causing the switchable layer to transition from another opaque state to the transparent state. To cause either one of such transitions, the processing device can cause the electrode assembly coupled to the switchable layer to apply a second defined electric field in a second defined direction across the switchable layer. At block 1120, the processing device can cause at least one of the first transparent display unit or the second transparent display unit to present respective digital contents. At block 1130, the processing device can cause at least one of the first transparent display unit or the second transparent display unit to present respective digital content.

Example Embodiments

In some instances, the following examples may be implemented together or separately by the systems and methods described herein.

Example 1 may include a display apparatus, comprising: a transparent display unit having a first surface and a second surface opposite the first surface; a first switchable layer forming an interface with the first surface, the first switchable layer formed to reversibly transition between a first transparent state and a first opaque state in response to a first defined electric field; a second switchable layer forming an interface with the second surface, the second switchable layer formed to reversibly transition between a second transparent state and a second opaque state in response to a second defined electric field.

Example 2 may include the display apparatus of example 1, wherein the first switchable layer comprises an electrochromic material.

Example 3 may include the display apparatus of example 1 and/or some other example herein, wherein the second switchable layer comprises an electrochromic material.

Example 4 may include the display apparatus of example 1 and/or some other example herein, wherein the first switchable layer comprises a first electrochromic material, and wherein the second switchable layer comprises a second electrochromic material.

Example 5 may include the display apparatus of example 1 and/or some other example herein, further comprising a control unit configured to: cause the first switchable layer to transition from the first transparent state to the first opaque state; and cause the second switchable layer to transition from the second opaque state to the second transparent state.

Example 6 may include the display apparatus of example 5 and/or some other example herein, wherein to cause the first switchable layer to transition from the first transparent state to the first opaque state, the control unit causes an electrode assembly to apply an electric field along a first direction relative to the interface with the first surface.

Example 7 may include the display apparatus of example 6 and/or some other example herein, wherein to cause the second layer to transition from the second opaque state to the second transparent state, the control unit causes an electrode assembly to apply a second electric field along a first direction relative to the interface with the second surface.

Example 8 may include a method, comprising: configuring a first portion of a first switchable layer in one of a first opaque state or a first transparent state, wherein the first switchable layer forms a first interface with a first surface of a transparent display unit; configuring a first portion of a second switchable layer in one of a second opaque state or a second transparent state, wherein the second layer forms a second interface with a second surface of the transparent display unit; and causing the transparent display unit to present digital content.

Example 9 may include the method of example 8, wherein the first portion of the first switchable layer spans the first switchable layer, the configuring the first portion of the first switchable layer comprising configuring the first switchable layer in the first opaque state, and wherein the first portion of the second switchable layer spans the second switchable layer, the configuring the first portion of the second switchable layer comprising configuring the second switchable layer in the transparent state.

Example 10 may include the method of example 8 and/or some other example herein, wherein the first portion of the first switchable layer spans the first switchable layer, the configuring the first portion of the first switchable layer comprising configuring the first switchable layer in the first transparent state, and wherein the first portion of the second switchable layer spans the second switchable layer, the configuring the first portion of the second switchable layer comprising configuring the second switchable layer in the opaque state.

Example 11 may include the method of example 8 and/or some other example herein, wherein the first portion of the first switchable layer spans the first switchable layer, and wherein the first portion of the second switchable layer spans the second switchable layer, further comprising: configuring the first switchable layer in the first opaque state during a first period; configuring the second switchable layer in the second transparent state during the first period; causing the transparent display unit to present a content frame of first digital content during the first period; configuring the first switchable layer in the first transparent state during a second period after the first period; configuring the second switchable layer in the second opaque state during the second period; and causing the transparent display unit to present a content frame of second digital content during the second period.

Example 12 may include the method of example 8 and/or some other example herein, wherein configuring the first portion of the first switchable layer comprises configuring the first portion of the first switchable layer in the first opaque state, further comprising configuring a second portion of the first switchable layer in the first transparent state.

Example 13 may include the method of example 11 and/or some other example herein, wherein configuring the first portion of the second switchable layer comprises configuring the first portion of the second switchable layer in the second transparent state, further comprising configuring a second portion of the second switchable layer in the second opaque state, wherein the first portion of the second switchable layer is opposite the first portion of the first switchable layer, and wherein the second portion of the second switchable layer is opposite the second portion of the first switchable layer.

Example 14 may include the method of example 12 and/or some other example herein, wherein the digital content comprises first digital content and second digital content, comprising: causing a first section of the transparent display unit to present the first digital content, the first section interposed between the first portion of the first switchable layer and the first portion of the second switchable layer; and causing a second section of the transparent display unit to present the second digital content, the second section interposed between the second portion of the first switchable layer and the second portion of the second switchable layer.

Example 15 may include a vehicle, comprising: a display apparatus comprising: a transparent display unit having a first surface and a second surface opposite the first surface; a first switchable layer forming an interface with the first surface, the first switchable layer formed to reversibly transition between a first transparent state and a first opaque state in response to a first defined electric field; a second switchable layer forming an interface with the second surface, the second switchable layer formed to reversibly transition from a second transparent state to a second opaque state in response to a second defined electric field.

Example 16 may include the vehicle of example 15, wherein the first switchable layer comprises an electrochromic material.

Example 17 may include the vehicle of example 15 and/or some other example herein, wherein the second switchable layer comprises an electrochromic material.

Example 18 may include the vehicle of example 15 and/or some other example herein, wherein the first switchable layer comprises a first electrochromic material, and wherein the second switchable layer comprises a second electrochromic material.

Example 19 may include the vehicle of example 15 and/or some other example herein, further comprising a second display apparatus including, a third switchable layer having a first surface and a second surface opposite the first surface, the third switchable layer formed to reversibly transition between a third transparent state and a third opaque state in response to a third defined electric field; a second transparent display unit forming an interface with the first surface; and a third transparent display unit forming an interface with the second surface.

Example 20 may include the vehicle of example 15 and/or some other example herein, wherein the first switchable layer comprises an electrochromic material.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

As is utilized in this disclosure, the term "processor" can refer to any type of processing circuitry or device. A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory.

Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

In some embodiments, processors can utilize nanoscale architectures in order to optimize space usage or enhance the performance of systems, devices, or other electronic equipment in accordance with this disclosure. For instance, a processor can include molecular transistors and/or quantum-dot based transistors, switches, and gates.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The flowchart and block diagrams in the figures illustrate the architecture, functionality, and operation of possible implementations of examples of systems, methods, and computer program products according to various embodiments of the present disclosure. In this regard, each block in the flowchart or block diagrams may represent a module, segment, or portion of instructions, which includes one or more machine- or computer-executable instructions for implementing the specified operations. It is noted that each block of the block diagrams and/or flowchart illustration, and combinations of blocks in the block diagrams and/or flowchart illustration, can be implemented by special purpose hardware-based systems that perform the specified functions or operations or carry out combinations of special purpose hardware and computer instructions.

Computer-readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable non-transitory storage medium within the respective computing/processing device.

What has been described herein in the present specification and annexed drawings includes examples of systems, devices, techniques, and computer program products that, individually and in combination, permit the reversible configuration of content presentation direction in transparent displays. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A display apparatus, comprising:
   a transparent display unit having a first surface and a second surface opposite the first surface;
   a first switchable layer forming an interface with the first surface, the first switchable layer formed to reversibly transition between a first transparent state and a first opaque state in response to a first defined electric field; and
   a second switchable layer forming an interface with the second surface, the second switchable layer formed to reversibly transition between a second transparent state and a second opaque state in response to a second defined electric field,
   wherein the first switchable layer comprises three or more first elongated slabs indexed sequentially with a natural number, and the second switchable layer comprises three or more second elongated slabs that are aligned with the three or more first elongated slabs in the first switchable layer, and wherein same-index first elongated slabs and same-index second elongated slabs comprise opposite states,
   wherein the transparent display unit comprises three or more third elongated slabs, wherein a combination of at least two non-contiguous elongated slabs of the three or more third elongated slabs presents complete content.

2. The display apparatus of claim 1, wherein the first switchable layer comprises an electrochromic material.

3. The display apparatus of claim 1, wherein the second switchable layer comprises an electrochromic material.

4. The display apparatus of claim 1, wherein the first switchable layer comprises a first electrochromic material, and wherein the second switchable layer comprises a second electrochromic material.

5. The display apparatus of claim 1, further comprising a control unit configured to:
   cause the first switchable layer to transition from the first transparent state to the first opaque state; and
   cause the second switchable layer to transition from the second opaque state to the second transparent state.

6. The display apparatus of claim 5, wherein to cause the first switchable layer to transition from the first transparent state to the first opaque state, the control unit causes an electrode assembly to apply an electric field along a first direction relative to the interface with the first surface.

7. The display apparatus of claim 6, wherein to cause the second switchable layer to transition from the second opaque state to the second transparent state, the control unit causes an electrode assembly to apply a second electric field along a first direction relative to the interface with the second surface.

8. A method, comprising:
   configuring a first portion of a first switchable layer in one of a first opaque state or a first transparent state, wherein the first switchable layer forms a first interface with a first surface of a transparent display unit;
   configuring a second portion of the first switchable layer in an opposite state to the first portion of the first switchable layer;
   configuring a third portion of the first switchable layer in an opposite state to the second portion of the first switchable layer;
   configuring a first portion of a second switchable layer in one of a second opaque state or a second transparent state, wherein the second switchable layer forms a second interface with a second surface of the transparent display unit;
   configuring a second portion of the second switchable layer in an opposite state to the first portion of the second switchable layer;
   configuring a third portion of the second switchable layer in an opposite state to the second portion of the second switchable layer;
   causing a first section of the transparent display unit to present a first portion of first digital content;
   causing a second section of the transparent display unit to present second digital content; and
   causing a third section of the transparent display unit to present a second portion of the first digital content.

9. The method of claim 8, wherein the configuring the first portion of the first switchable layer comprises configuring the first portion of the first switchable layer in the first opaque state, and
   wherein the configuring the first portion of the second switchable layer comprises configuring the first portion of the second switchable layer in the second transparent state.

10. The method of claim 8, wherein the configuring the first portion of the first switchable layer comprises configuring the first portion of the first switchable layer in the first transparent state, and
    wherein the configuring the first portion of the second switchable layer comprises configuring the first portion of the second switchable layer in the second opaque state.

11. The method of claim 8, further comprising:
    configuring the first portion of the first switchable layer in the first opaque state during a first period;
    configuring the first portion of the second switchable layer in the second transparent state during the first period;

causing the transparent display unit to present a content frame of first digital content during the first period;

configuring the first portion of the first switchable layer in the first transparent state during a second period after the first period;

configuring the first portion of the second switchable layer in the second opaque state during the second period; and causing the transparent display unit to present a content frame of second digital content during the second period.

12. The method of claim 8, wherein configuring the first portion of the first switchable layer comprises configuring the first portion of the first switchable layer in the first opaque state, and configuring the second portion of the first switchable layer comprises configuring the second portion of the first switchable layer in the first transparent state.

13. The method of claim 12, wherein configuring the first portion of the second switchable layer comprises configuring the first portion of the second switchable layer in the second transparent state, and configuring the second portion of the second switchable layer comprises configuring the second portion of the second switchable layer in the second opaque state, wherein the first portion of the second switchable layer is opposite the first portion of the first switchable layer, and wherein the second portion of the second switchable layer is opposite the second portion of the first switchable layer.

14. The method of claim 8, wherein the first section of the transparent display unit is interposed between the first portion of the first switchable layer and the first portion of the second switchable layer; and and wherein the second section of the transparent display unit is interposed between the second portion of the first switchable layer and the second portion of the second switchable layer.

15. A vehicle, comprising:

a display apparatus comprising:

a transparent display unit having a first surface and a second surface opposite the first surface;

a first switchable layer forming an interface with the first surface, the first switchable layer formed to reversibly transition between a first transparent state and a first opaque state in response to a first defined electric field; and a second switchable layer forming an interface with the second surface, the second switchable layer formed to reversibly transition from a second transparent state to a second opaque state in response to a second defined electric field, wherein the first switchable layer comprises three or more first elongated slabs indexed sequentially with a natural number, and the second switchable layer comprises three or more second elongated slabs that are aligned with the three or more first elongated slabs in the first switchable layer, and wherein same-index first elongated slabs and same-index second elongated slabs comprise opposite states, wherein the transparent display unit comprises three or more third elongated slabs, wherein a combination of at least two non-contiguous elongated slabs of the three or more third elongated slabs presents complete content.

16. The vehicle of claim 15, wherein the first switchable layer comprises an electrochromic material.

17. The vehicle of claim 15, wherein the second switchable layer comprises an electrochromic material.

18. The vehicle of claim 15, wherein the first switchable layer comprises a first electrochromic material, and wherein the second switchable layer comprises a second electrochromic material.

19. The vehicle of claim 15, further comprising a second display apparatus including, a third switchable layer having a first surface and a second surface opposite the first surface, the third switchable layer formed to reversibly transition between a third transparent state and a third opaque state in response to a third defined electric field;

a second transparent display unit forming an interface with the first surface; and a third transparent display unit forming an interface with the second surface.

20. The vehicle of claim 19, wherein the third switchable layer comprises an electrochromic material.

* * * * *